United States Patent [19]
Barton et al.

[11] Patent Number: 5,121,374
[45] Date of Patent: Jun. 9, 1992

[54] METHOD FOR AUTOMATICALLY COMPENSATING FOR THE ECCENTRICITY IN AN OPTICAL HEAD POSITIONING SERVO-MECHANISM

[75] Inventors: Mark A. Barton, Rochester; Daniel L. Nelson; Gerald J. Smart, Jr., both of Penfield, all of N.Y.

[73] Assignee: Eastman Kodak Company, Rochester, N.Y.

[21] Appl. No.: 426,356

[22] Filed: Oct. 25, 1989

[51] Int. Cl.⁵ .............................................. G11B 21/10
[52] U.S. Cl. ................................ 369/44.29; 369/44.32; 369/44.34; 369/44.35; 369/44.36; 369/32
[58] Field of Search ............. 369/32, 43, 44.25, 44.29, 369/44.32, 44.34, 44.35, 44.36, 54; 358/907, 342; 300/77.03, 78.04, 78.06, 78.09

[56] References Cited
U.S. PATENT DOCUMENTS
4,628,379 12/1986 Andrews, Jr. et al. .......... 360/77.05
4,764,914 8/1988 Estes et al. ....................... 369/111 X Primary Examiner—Roy N. Envall, Jr.
Assistant Examiner—Hung T. Dang
Attorney, Agent, or Firm—William W. Holloway

[57] ABSTRACT

The present method operates upon an optical disk type servo-system of the type having an optical tracking servo for maintaining a lens centered over a track on a disk and a tracking position servo for moving an optical head's lens to a desired position. Included within such a system is an eccentricity sub-system for providing a compensating sine wave signal for reducing errors in tracking due to disk decentering. The present method automatically adjusts the gain in one of the servos to match the gain appearing in the other servo so as to improve the smoothness of control when switching between the servos.

2 Claims, 4 Drawing Sheets

METHOD FOR AUTOMATICALLY COMPENSATING FOR THE ECCENTRICITY IN AN OPTICAL HEAD POSITIONING SERVO-MECHANISM

TECHNICAL FIELD OF THE INVENTION

The present invention relates to positioning servo-mechanisms for optical disk systems and more specifically to a method for compensating for the rotational eccentricity of an optical disk through the generation of a compensating signal to be added in a tracking control loop.

BACKGROUND OF THE INVENTION

One type of optical disk system employs an "access system" for positioning the optical head radially, providing a very coarse tracking control. A fine tracking system, including an optical tracking servo and a tracking position servo, moves only the objective lens of the optical head. The objective lens is mounted in an electro-magnetic actuator on light springs, permitting two axis of freedom, one vertical for focusing, one radial for tracking. The usable range of tracks which can be reached by moving only the lens is referred to as a "tracking window".

The two tracking servos play the following roles during drive operation:

1. Optical Tracking Servo—This servo uses an error signal developed optically by the head, indicating lens position relative to a track on the disk, to maintain the lens position centered over the track.

2. Tracking Position Servo—This servo system is used primarily during access system moves. The natural response of the actuator is highly under-damped. Therefore, when the entire head is moved abruptly from one position to another, the actuator tends to ring at its natural frequency for an excessive period of time. Among other problems, the resulting large cross-track velocity at the center of the lens travel prevents the optical tracking servo from acquiring lock properly.

The position servo uses an error signal, developed from lens position detectors in the actuator, to hold the lens centered in the actuator. When the drive control electronics is about to move the head, the position servo is activated to hold the lens centered during the access system move. When the access system move is complete, the position servo is turned back off, and the optical tracking servo is locked.

The tracking system also includes a sub-system designed to reduce the effects of disk to spindle decentering. This "eccentricity" sub-system measures the magnitude and phase of the disk decentering when a disk is first clamped, and generates a matched, compensating sine wave thereafter. The optical tracking servo utilizes the sine wave as a feed forward, to reduce the residual detracking due to disk decentering. The position servo uses the sine wave as a "commanded position", so that when the drive switches from the tracking position servo back to the optical tracking servo, the lens will already be in the correct position with the correct velocity, on the eccentricity sine wave. This avoids a step change in the actuator drive when the servo mode is switched from position servo to optical tracking servo. Thus, there are two paths for the eccentricity compensating sine wave to reach the actuator.

The purpose of the present invention is to automatically adjust the gain of one of these two paths, so that the actuator sensitivity to the eccentricity compensating sine wave is the same for both paths.

SUMMARY OF THE INVENTION

In the preferred method, an algorithm performed in software selects a setting for an "eccentricity match gain circuit". The auto-calibration is performed with all tracking servos open loop. A large amplitude eccentricity sine wave is generated for calibration purposes. This does not require a disk to be present, only the sine wave is required. A servo select multiplexer is set to pass the optical tracking servo channel, thereby permitting the eccentricity wave to drive the actuator via the feed forward to a summing node. The actuator is then given sufficient time to settle into its steady state response to the sinusoidal driving function (the eccentricity wave).

The following measurement is then performed at each setting of an "eccentricity match gain circuit". A residual position error signal is sampled periodically (with an A to D converter) for one full cycle of the eccentricity wave, at a rate sufficient to yield good resolution well beyond the frequency of the actuators natural resonance and beyond the frequency of the eccentricity wave. The fundamental term of a Fourier series is then calculated for this "time record" of data taken over one cycle of the eccentricity wave. Since the fundamental frequency is known (the frequency of the driving function), only the fundamental term of the Fourier series need be calculated. The magnitude of this term indicates the degree of mismatch between the two paths. This mismatch magnitude is measured, calculated and recorded at each setting of the "eccentricity match gain circuit". When all the measurements have been made, a straight line is fitted to the data relating the degree of mismatch in the servo paths to the setting of the ECC, match gain DAC (see, for example, FIG. 3), and the setting of the "eccentricity match gain circuit" is selected at the zero crossing (the point of minimum mismatch magnitude).

There exists the possibility that on some systems the large signals, due to the extreme mismatches encountered at the limits of the auto-calibration, will exceed the range of the A to D converter. The software algorithm handles this situation by not including such measurements in the straight line fit. Such data is easily detected, since the result of the single term Fourier coefficient calculation is greater than the A to D converter range.

From the foregoing, it can be seen that it is a primary object of the present invention to provide an automatic eccentricity matching method for an optical head lens positioning servo-system.

It is a further object of the present invention to provide a method for adjusting the sensitivity of two signal paths to an eccentricity compensating signal.

These and other objects of the present invention will become more apparent when taken in conjunction with the following description and drawings, wherein like characters indicate like parts and which drawings form a part of the present description.

DESCRIPTION OF THE PREFERRED EMBODIMENTS

Figure 1:
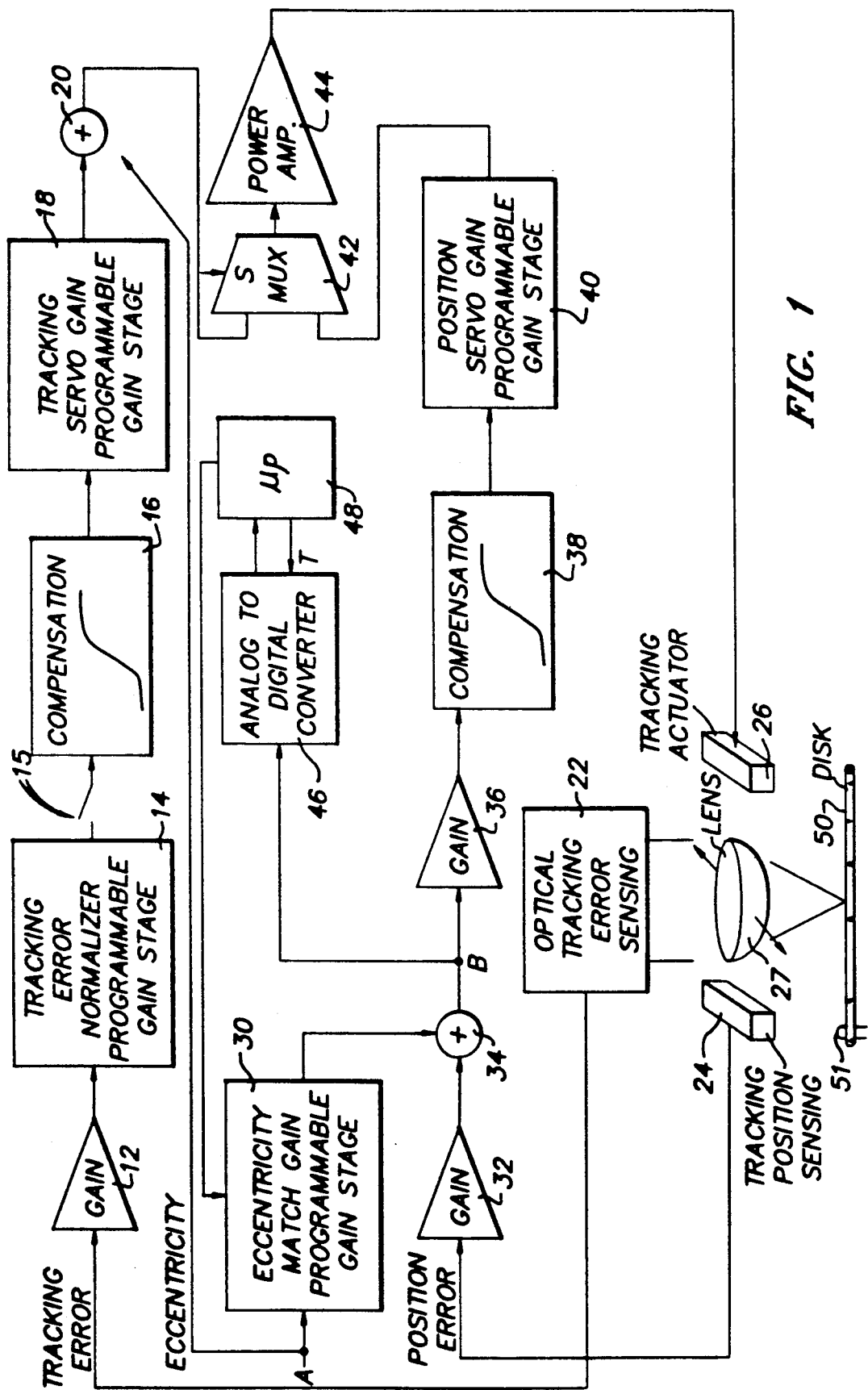
FIG. 1 is a block schematic diagram illustrating a system on which the present invention maybe implemented.

FIG. 1 illustrates the preferred apparatus upon which the present invention is implemented. A gain amplifier 12 receives the tracking error signal and amplifies the signal for use by a tracking error normalizer circuit 14. The output from the normalizer circuit 14 can be sampled or taken out of the loop by means of a switch 15. A compensation circuit 16 is connectible to the output of the normalizer circuit 14 by means of the switch 15. Once compensated, the signal is directed to a tracking servo gain circuit 18, which provides at its output a signal that is a function of the tracking error compensated. This signal is directed to a summing node 20 and from the summing node to an input to a multiplexer 42. An additional input to the summing node is an eccentricity sine wave signal. A sub-assembly of the type disclosed in U.S. Pat. No. 4,764,914 entitled, "Least Squares Method and Apparatus for Determining Track Eccentricity of a Disk", by M. Estes may be used to generate the eccentricity correction sine wave used by this system. An additional input to the multiplexer 42 is provided through a second servo position path, which receives on its input, a position error signal that is amplified by a gain amplifier 32 and is forwarded to a summing node 34. The eccentricity signal, aside from being inputted to the summing node 20, appears at the input to an eccentricity match gain circuit 30 which outputs an amplified signal to the summing node 34 to be summed with the position error signal amplified from the gain circuit 32. This summed signal is a residual position error signal that is directed to a gain amplifier 36 and to the input of an analog-to-digital converter 46. The analog-to-digital converter 46 is operated as a sampler to take samples of the residual position error signal over at least one cycle of the eccentricity wave signal. The sampled digital signal from the analog-to-digital converter 46 is fed to a micro-processor 48. The micro-processor 48 performs a Fourier series fundamental coefficient summation for each gain setting of the programmable gain stage 30. Additionally, the micro-processor 48 performs a least squares fit and determines the optimum gain setting for the programmable gain stage 10, as will be described. The micro-processor 48 also provides the sample control signal T to the analog-to-digital converter 46 to perform the proper sampling. The amplified signal from gain amplifier 36 is directed to the input of a compensating circuit 38. The compensated output signal is directed to a position servo gain amplifier 40 and from there to the other input of the multiplexer 42. The output of the multiplexer 42 is amplified by a power amplifier 44 and is directed to the coils of a tracking actuator 26. The tracking actuator 26 positions a lens 27 with respect to a disk 50. The disk 50 is rotated by a drive spindle 51. An optical tracking error sensor 22 provides a signal indicative of the deviation of the lens position over a track on the disk 50. The tracking error signal from the error sensor 22 is directed to the input of the gain amplifier 12. A tracking position sensor 24 provides a position error signal to the gain amplifier 32 which signal is in turn used to drive the tracking actuator 26 to position the lens. The multiplexer 42 output is determined by the state of a servo select signal S.

Figure 2:
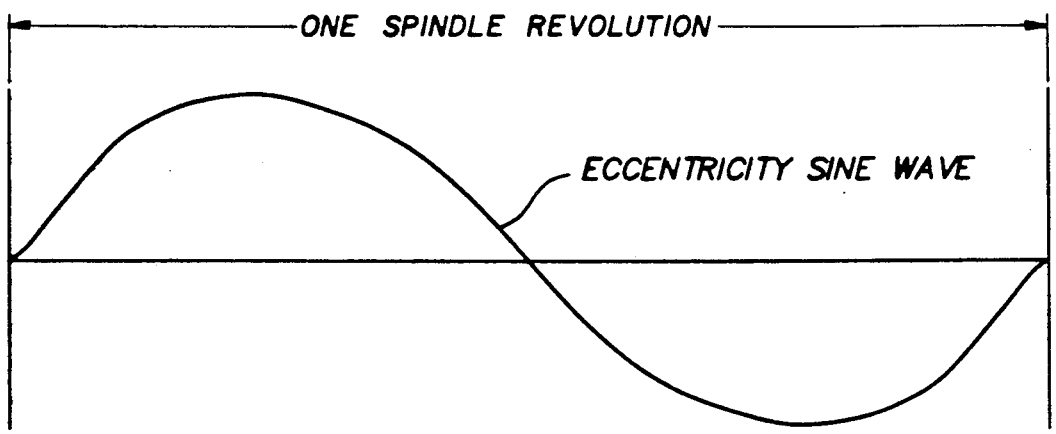
FIG. 2 illustrates an eccentricity sine wave appearing at point A in FIG. 1.
Figure 3:
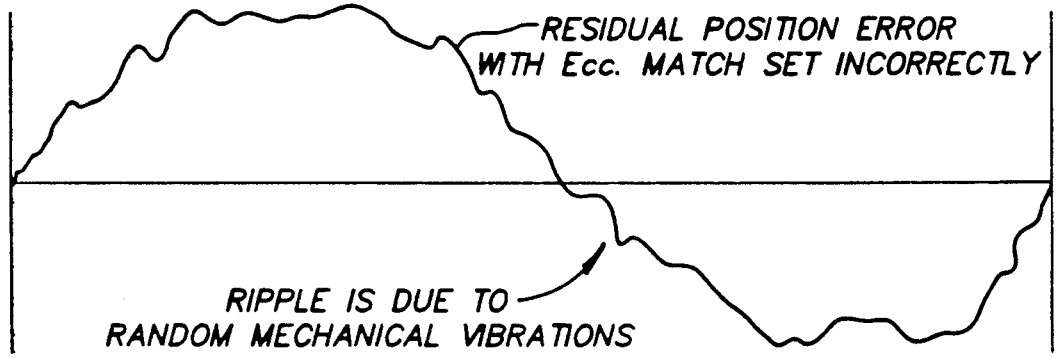
FIG. 3 illustrates a residual position error signal appearing at point B in FIG. 1.
Figure 5:
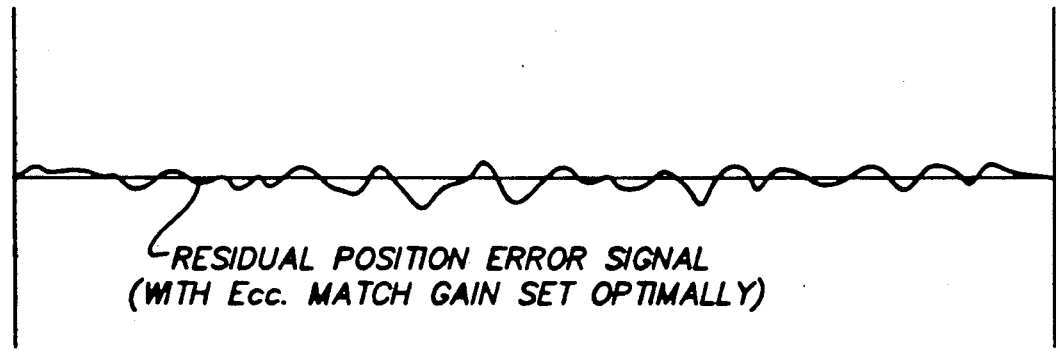
FIG. 5 illustrates a residual position error signal for correct gain matching appearing at point B in FIG. 1.
Figure 4:
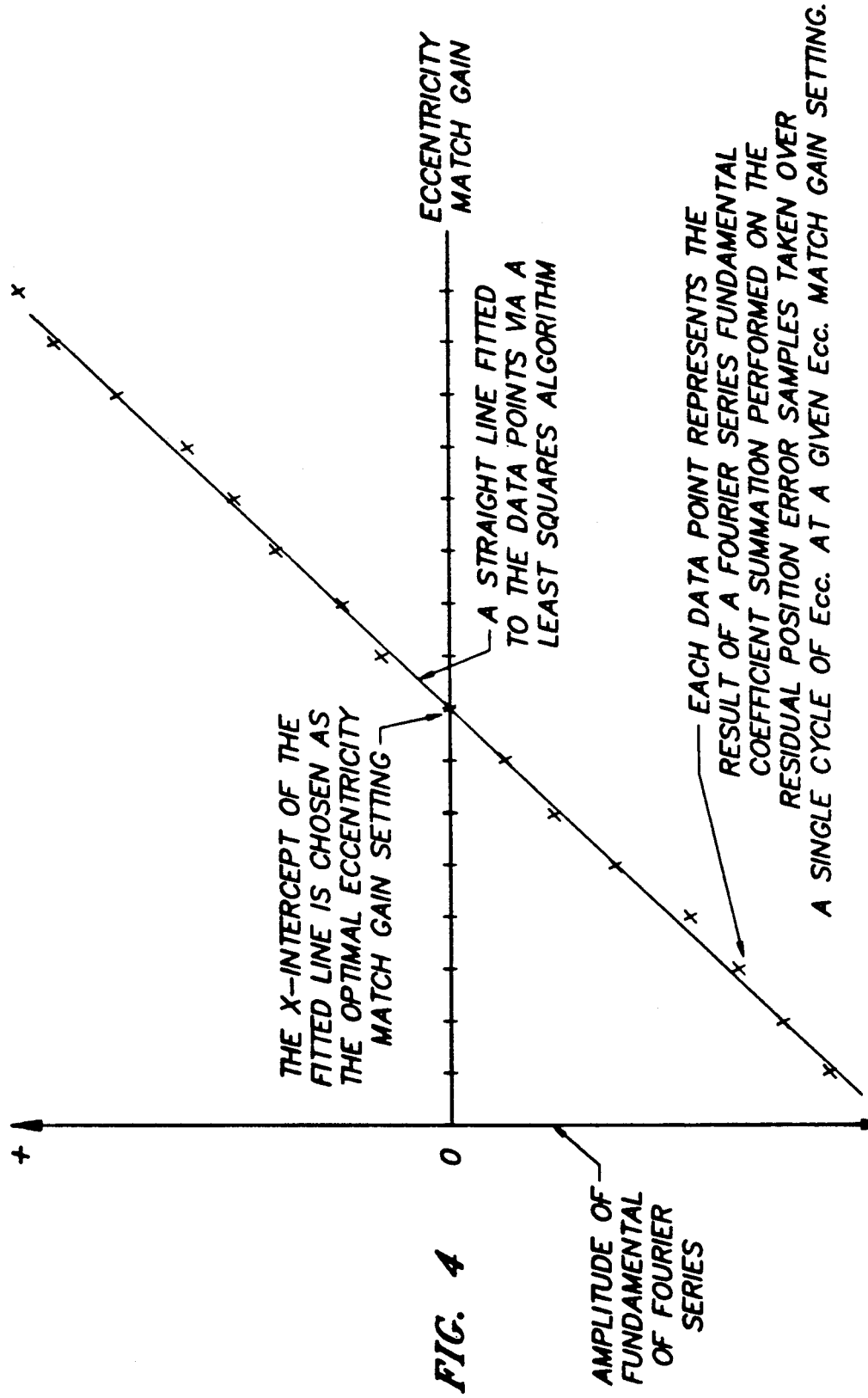
FIG. 4 is a plot illustrating the determination of an optimal gain point.

In operation, the software selects a setting in the eccentricity match gain circuit 30, which is a starting position, and the automatic calibration is initiated with all tracking servos being open-loop. A large amplitude eccentricity sine wave (shown in FIG. 2 for one revolution of the spindle or disk 50) is generated and applied to the input labeled A. This operation does not require a disk to be present, only a sine wave is required. The servo select multiplexer signal S is set to pass the optical tracking servo channel signal, thereby, permitting the eccentricity wave to drive the actuator 26 via the feed forward to the summing node 20. The actuator 26 is provided with sufficient time to settle into a steady state response to the sinusoidal driving function. The following measurement is then performed over the full range of settings for the eccentricity match gain circuit 30. The residual position error signal at terminal B (shown in FIGS. 3A and 3B) is sampled periodically with, for example, the analog-to-digital converter 46 for one full cycle of the eccentricity sine wave at a rate sufficient to yield good resolution beyond the frequency of the actuator 26's natural resonance. A single fundamental term of a Fourier series is then calculated for this time record of data for one full cycle of the eccentricity sine wave. Since the fundamental frequency of the sine wave is known, only the fundamental term of the Fourier series need be calculated. The magnitude of this term indicates the mismatch between the two paths. That is, the path at the output of the multiplexer 42, traversed by the eccentricity signal at point A through the summer of 20 to an input of the multiplexer 42 and likewise, through the eccentricity match gain circuit 30 through the summer of 34 to point B and to the input of the analog-to-digital converter 46. With all measurements made, a straight line is fitted to the data and the setting of the eccentricity match gain circuit 30 is set at the zero crossing by the micro-processor 48. When this is done the residual position error signal of FIG. 3B is the result.

Figure 6:
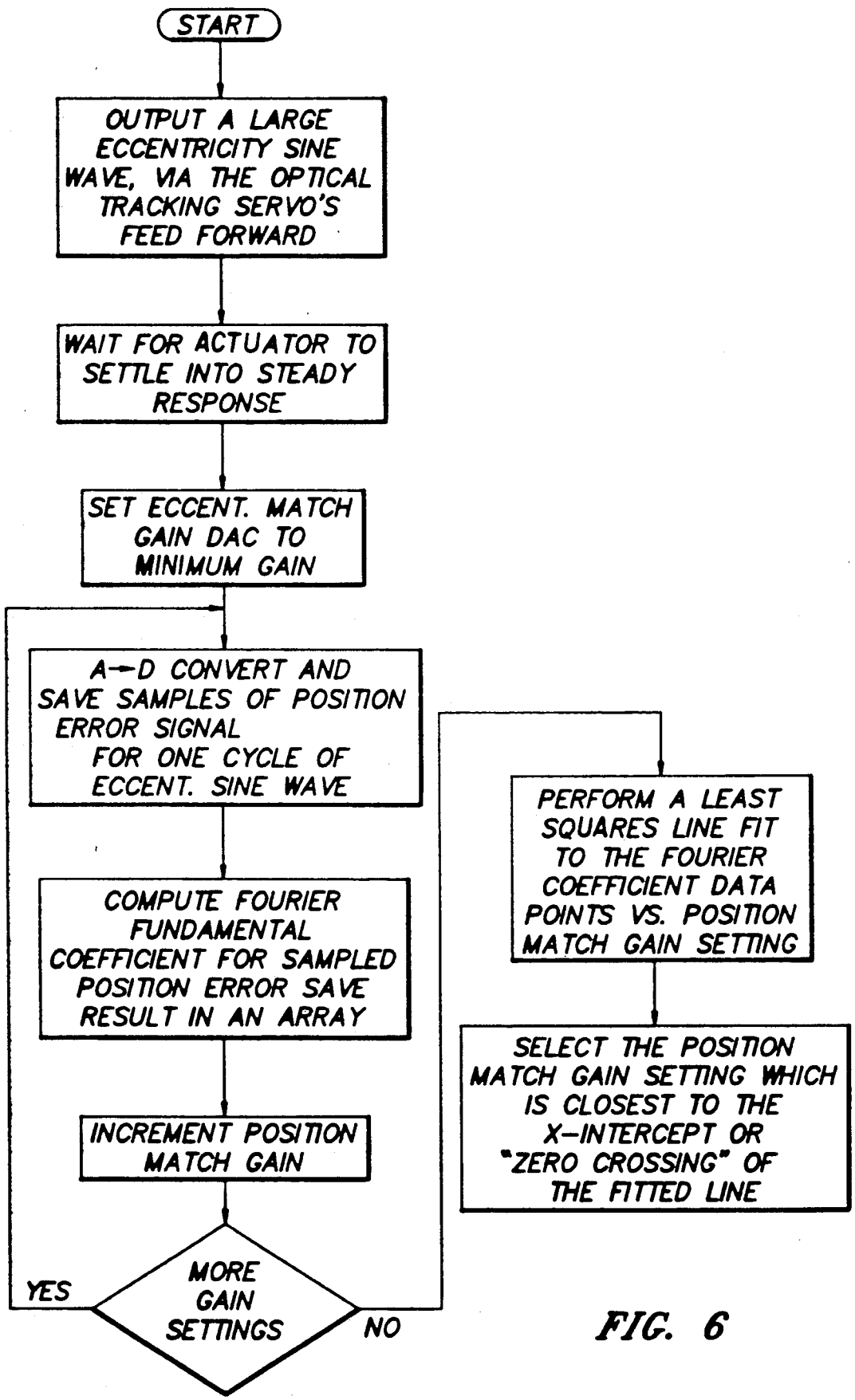
FIG. 6 is a flow chart illustration of the method of the present invention.

FIG. 6 is a flow chart illustrating each of the previously mentioned steps of the present method.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A method for automatically compensating for the eccentricity in an optical head lens positioning servo-mechanism of the type having an optical tracking servo and a tracking position servo both of which are to be compensated for eccentricity, said method comprising the steps of:

applying an eccentricity correcting signal to said tracking position servo with said tracking position servo in an open loop mode;

sensing the position error signal from said open loop servo;

applying the eccentricity correcting signal to a gain circuit having a plurality of selectable gain values to provide an amplified eccentricity correcting signal with said gain circuit being part of the optical tracking servo;

summing the amplified eccentricity correcting signal with said sensed position error signal to provide a residual position error signal;

sampling said residual position error signal over one cycle of the eccentricity correction signal;

determining Fourier series fundamental terms at each of said plurality of selectable gain values for each sampling of said residual position error signal;

employing a least squares algorithm to perform a straight line fit of said determined Fourier series fundamental terms; and selecting the one selectable gain value the intersects the straight line fit so as to minimize the response difference between the optical tracking servo and the tracking position servo to the eccentricity correction signal.

2. The method according to claim 1 wherein said applying step includes the step of applying an eccentricity signal that is a sine wave signal having a frequency such that one cycle of the eccentricity signal corresponds to one cycle of the media on which the optical head is to read or write.

* * * * *